Dec. 17, 1935.  J. E. JOHNSON  2,024,579
JOINT FOR STANDPIPES AND THE LIKE
Filed April 4, 1935  2 Sheets-Sheet 1
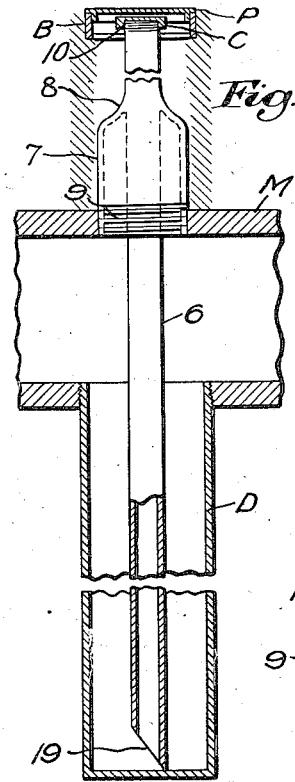
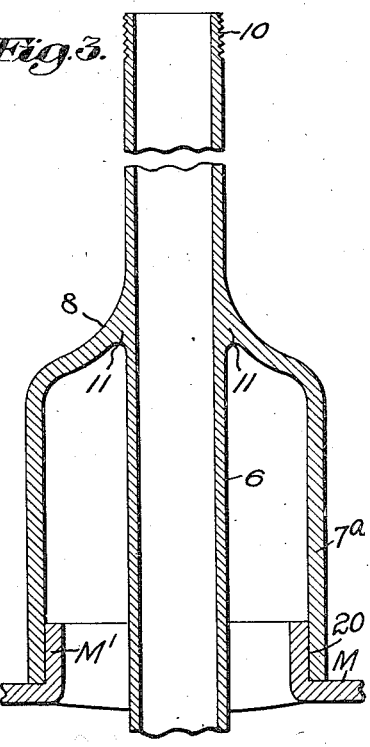
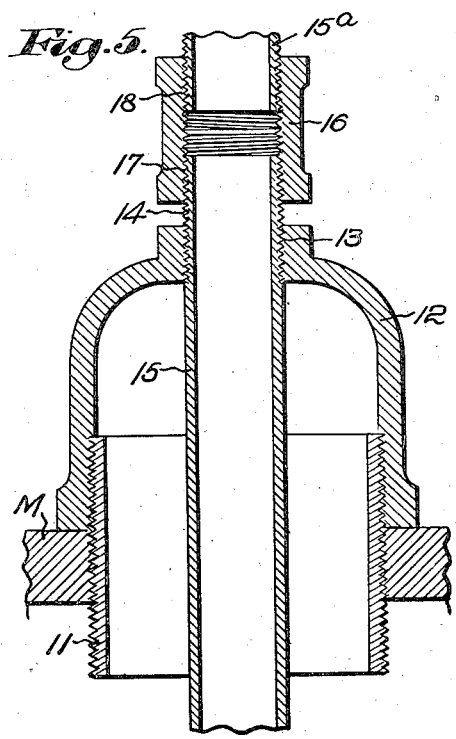
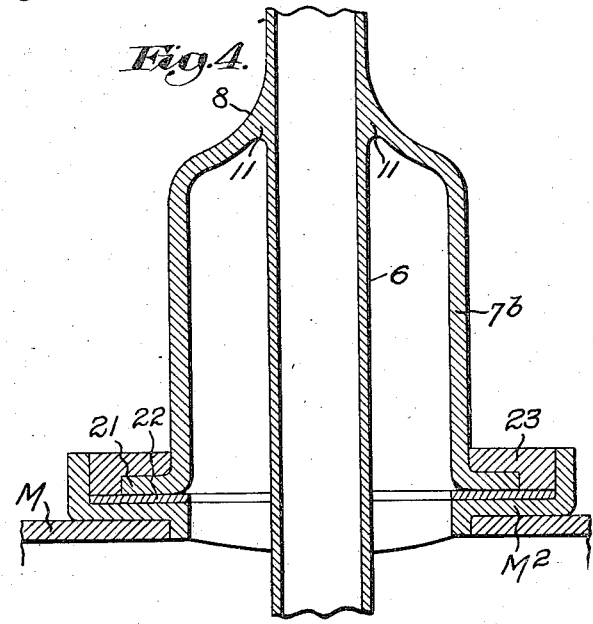

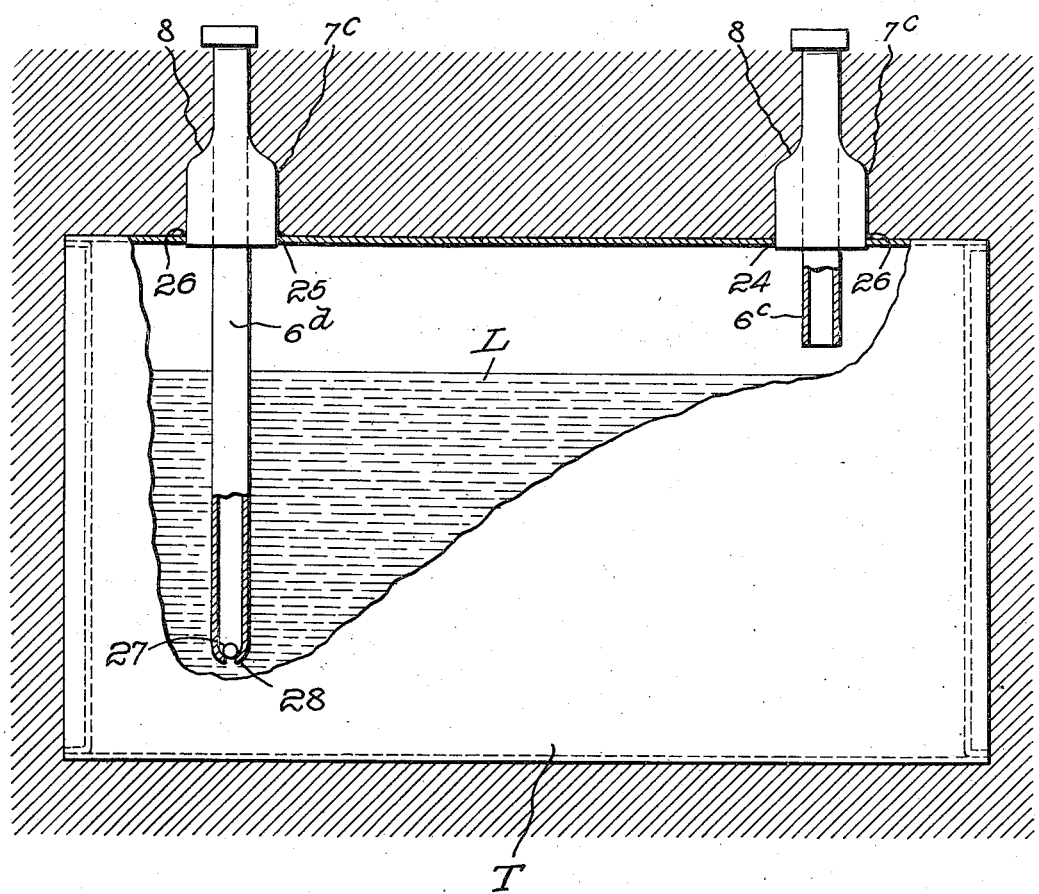

Patented Dec. 17, 1935

2,024,579

UNITED STATES PATENT OFFICE 2,024,579

JOINT FOR STANDPIPES AND THE LIKE

John E. Johnson, Wakefield, Mass.

Application April 4, 1935, Serial No. 14,651

4 Claims. (Cl. 285—198)

My present invention relates to pipe joints or couplings and more particularly aims to provide an integral unitary device or fitting especially adapted for use in the installation of standpipes, lead-offs, vents, and other fluid outlets of a heavy duty type, generally for outdoor and underground purposes.

In the drawings, illustrating by way of example certain embodiments of the invention, Fig. 1 shows a device embodying my invention as installed in one connection with which it is particularly useful;

Fig. 2 is a section upon a larger scale of the joint or fitting of Fig. 1;

Figs. 3 and 4 are views corresponding to Fig. 2 illustrating different embodiments;

Fig. 5 illustrates an assembled coupling arrangement typical of the prior practice; and Fig. 6 shows devices of my invention in connection with a storage tank, such as for gasoline, fuel oil and the like.

Referring to the drawings in more detail, and first to Figs. 1 and 2, I have there shown an integrally formed or fabricated one-piece, structurally integral fitting unit or coupling. As illustrated it comprises a central pipe 6 of appropriate diameter, and a supporting and connecting element or coupling 7. The latter is shown as a bell-like part, the open end of which is of larger diameter than the pipe 6 and is spaced from it. The pipe extends centrally through said coupling, the smaller and closed end of which is integrally, rigidly and permanently connected to the pipe, as at 8. The open end of the bell-like coupler 7 is adapted for connection with the part to which the standpipe is to be applied. The connection may be of any suitable or preferred form, either external or internal with respect to the base or skirt of the coupler 7, such for example as the threaded portion 9 of Figs. 1 and 2.

The standpipe or like fitting of my invention finds one important use in connection with gas mains or other pipe lines where it is desirable to provide at various points means for collecting and removing fluid of condensation. Fig. 1 may be considered as typical of such installation, wherein M represents a high pressure or other gas main having connected to it at the appropriate point a so-called drip box or chamber D for catching and collecting the fluid of condensation. In such connection it is essential periodically to draw off the collected condensate, and customarily for this purpose a standpipe is led down through the main M and into the collecting chamber D. Above the main, the standpipe extends up to a convenient point at or adjacent the ground level. Its upper end generally is equipped for attachment of a pump, as by means of the upper threaded portion 10 in Fig. 1. The standpipe usually is closed as by the removable cap C, Fig. 1, and may be housed in a box or the like B which may have a removable cover or plate P.

Gas mains are buried to various depths depending upon the locality of the installation, preferably being laid below frost level, but in most instances the standpipes, such as referred to, coming up to or well toward the suface, are subject to the strains and heaving effects produced by frost action. They are also subject to the usual underground conditions which are productive of rust and corrosion. These conditions have frequently resulted in cases of breakage, cracking or separation of joints at the heretofore vulnerable points in standpipe fittings, with resultant dangerous leakage.

In Fig. 5 I have illustrated a typical assembly such as heretofore used for the standpipe or pump-out connections for the condensate chambers of gas mains, it being built up of a plurality of assembled couplings and fittings. The large bushing 11 is tapped into the wall of the main and has its upper end threaded into a reduction member 12, which in turn is tapped at its smaller end, as at 13, to receive the correspondingly threaded portion 14 of the lower part 15 of the standpipe. The latter is in turn connected to the upper portion 15a as by means of a coupling sleeve 16, involving two additional threaded joints, as indicated at 17 and 18 respectively. It will be noted that there are at least five points of threaded connection in such standpipe assembly and its coupling means. Under the frost and other conditions previously referred to such an assembly not only is likely to become leaky in one or more of the joints, but frequently has broken or snapped off at or adjacent the small end of the reduction member 12, between the latter and the coupling sleeve 16.

By the provision of an integral unitary standpipe coupling or structure in accordance with my invention, the difficulties referred to have largely been eliminated. As clearly seen in detail and upon a larger scale in Fig. 2, the pipe 6 is integrally fashioned in one piece with a bell-like coupling element 7. The one piece standpipe of my invention may be manufactured in accordance with any of the processes employed in the production of pipe and couplings. It may be formed of any desired material, including cast iron, steel or any of the various alloys which afford protection against rust and corrosion. The integral construction illustrated may be produced by coring and casting the whole device as one piece, in the instance of cast iron, for example. Where steel piping is used, the device may be fabricated as by welding in the region, indicated by the numeral 11, where the smaller and closed part of the coupling 7 joins the standpipe proper. The metal of the walls may be thickened and supplemented in this region, substantially in the manner illustrated, producing a strong, rigid union and actual reenforcement. Thus what in the prior plural-part assemblies is a point of greatest weakness, in the unitary device of my invention becomes substantially the strongest portion of the standpipe as a whole, and the ground stresses are in effect transferred to the larger diametered coupling, rather than being received by smaller and weaker parts and joints. Moreover, there is but a single threaded or other joint in that form of the device of my invention as illustrated in Figs. 1 and 2, namely that indicated at 9 where the wide end of the coupler 7 is directly tapped into the wall of the main M, as against a plurality of four or more connecting joints in an assembly such as that of Fig. 5.

The fluid-conducting pipe or standpipe proper 6 may be of any desired length appropriate to the conditions at the point of use. Its length below the coupling 7 desirably is sufficient to extend down to or substantially to the bottom of the condensate chamber D. Its lower end may be beveled off as indicated at 19 to provide for removal of the fluid at the extreme bottom of the chamber. Above the coupler 7 the pipe is of any suitable length to lead up to the ground level or other desired point. The pipe may be supplied in standard or other lengths which may be cut and threaded on the job, to suit the particular conditions.

In addition to the important advantages of strength and substantial freedom from leakage, the reduction in the number of parts, by doing away with separate bushings, reductions, threaded sleeves and the like, results in a substantial saving in time and labor costs for installation. The integral coupler-equipped one-piece standpipe of my invention may be supplied in various standard sizes to fit any pipe coupling or threaded connection, such, for example, as 2″ x 1″, 2″ x ¾″, 1½″ x ¾″, 1″ x ¾″, 1″ x ½″, and so forth, the first dimension representing the diameter of the threaded or other coupling to which the connection is to be made, and the second one the diameter of the standpipe proper to which the reduction is effected.

It will be understood that the particular use illustrated in Fig. 1 is illustrative merely, and that the unitary standpipe or vent and coupling of my invention is readily applicable to use in connection with storage tanks and containers, steam lines, oil lines, or in fact any heavy duty installation where fluid is to be led off. In Figs. 2, 3, and 4, for example, the part designated as M may be considered as representing the wall of a gasoline or fuel oil storage tank, or other fluid container. In connection with such use the integral devices of my invention are effective to avoid the loss of suction in drawing off the stored contents, such as frequently has occurred through opening or loosening of the joints and connections of previous installations.

In Fig. 3 I have illustrated a standpipe and integral coupler arranged for attachment at the point of use otherwise than by threaded connection, as where the element M, which may be a gas main or other pipe line, or a storage tank or other receptacle or container from which fluid is to be drawn off, has a non-threaded attaching collar M′. The open or wide end of the coupling 7ᵃ is made with an internal diameter adapting it to seat over the collar M′ to which it may be welded or otherwise united, as indicated at 20.

Fig. 4 illustrates still another form of connecting means for my integral standpipe, which otherwise may be the same as in the previous figures. In this instance the lower end of the coupling 7ᵇ is provided with an outturned flange 21 adapted to seat flatwise within the flared and flanged member M² formed on or attached to the main or the like M. If desired a gasket 22 may be employed below the coupling 7ᵇ, and the joint is completed by calking and cementing as indicated at 23. In connection with the form illustrated in Fig. 4, as well as that of any of the other figures, the pipe and coupling, if not formed of a non-corrosive or rust-resistant material, may be given a protective coating of suitable material. Such coating may also afford protection against electrolytic action, in localities where the installation may be subject to stray ground charges or other influence likely to set up a destructive electrolysis, any suitable insulating compound, such as a bitumastic coating, being employed for the purpose.

Referring to Fig. 6 I have there illustrated installations of my integral standpipe and coupling means in connection with a fluid storage tank or reservoir, such, for example, as used for the storage of gasoline, fuel oil or other fluids. As illustrated in said figure, the tank T for the storage of fluid L is provided with one or more apertures in a wall thereof, herein the upper wall, an inlet aperture being indicated at 24 and an outlet aperture at 25. The standpipe structures may be substantially the same as in the preceding figures. In connection with the inlet aperture the pipe 6ᶜ may be of relatively short extent inside the tank. The supporting and coupling element 7ᶜ, as illustrated, is set within the aperture 24, either flush with the tank wall or projecting below the same to the desired extent, the coupling being integrally fashioned and united with the pipe at 8, as in the previous figures. The positioned coupling may be secured and sealed in position as by welding it directly to the wall of the tank, as indicated at 26, or any of the forms of connection as previously illustrated may be employed. The outlet or withdrawal pipe and coupling, at the left in Fig. 6, may be the same as that for the inlet, the supporting and coupling element 7ᶜ being integrally united with the pipe 6ᵈ at 8. The pipe in this instance is of such extent through and beyond the coupling as to approach the bottom of the tank to the desired level. If it is desired to sustain a column of fluid within the pipe I may provide for the purpose a ball check valve 27 having a seat 28 at the lower end of the pipe 6ᵈ. In an installation such as that of Fig. 6, as well as those of the previous figures, the unitary device of my invention is particularly effective in avoidance of loss of suction due to loosening or opening up of joints, by frost action or other forces, as frequently encountered in connection with assembled outlet pipes as generally heretofore employed.

My invention is not limited to the particular embodiment thereof illustrated and described herein, its scope being set forth in the following claims:

I claim:

1. A one-piece standpipe and coupling device comprising in combination a central pipe of given diameter, and a relatively larger concentrically surrounding cylindrical and continuous-walled bell-like support and reduction coupling intermediate the ends of said pipe, the upper end of said coupling being closed and there integrally united with said pipe externally thereof, and the lower end of said coupling being entirely open across a diameter at least as great as the maximum internal diameter of the coupling thereby to avoid internal projections on the walls of the coupling and being provided at its base with means for attaching and supporting said unitary one-piece device in operative position, the end of said pipe projecting from the open end of said coupling being extended substantially below the latter, to afford fluid access means for a chamber on the upper wall of which said device is adapted to be installed.

2. As a new article of manufacture, a unitary standpipe structure for use as a fluid outlet in connection with condensate collectors of gas mains and other pipe lines and other heavy duty or underground installations, said structure consisting of a pipe of a length to extend from the lowest fluid level to which access is desired, to a level at which a pump or other connection is to be made, said pipe having integrally united to and surrounding it, at the appropriate point spaced from its ends, a cylindrical bell-like coupling element, the upper end of which has initial and permanent closed integral union with the pipe and the bottom end of which is of a diameter at least equaling the greatest diameter of the coupling, and is provided with an unrestricted bottom opening defined by an attaching portion arranged for pipe-supporting connection with an upper portion of the part on which the standpipe structure is to be installed.

3. In combination with a gas main and a downwardly extending condensate collecting chamber therefor, said main having an aperture in its wall opposite said chamber, a one-piece standpipe device for said main and chamber, for removal of the collected fluid from the latter, said device comprising a cylindrical, continuous-walled reduction coupling having means at its lower end adapting it for attachment to the main concentrically with said aperture and as a closure therefor, and a pipe extending centrally through said coupling and integrally united to form a structural unit with it, said pipe extending below the coupling to or substantially to the bottom of said collecting chamber and projecting above the coupling to the desired access level, and said coupling being of maximum diameter at its lower, attaching end, and having its internal diameter at no point greater than the diameter of said aperture to which the device is applied.

4. In combination with a fluid storage tank provided with an aperture in a wall thereof, a one-piece standpipe device for affording access to the tank, for supplying or withdrawing fluid, said device comprising a cylindrical, continuous-walled reduction coupling having sealed connection with the wall of the tank adjacent said aperture and as a closure therefor, and a pipe extending centrally through said coupling and integrally united to form a structural unit with it, said pipe extending from a point outside the tank to the inside point desired for filling or removal purposes, and said coupling being of maximum diameter at its lower, attaching end, and having its internal diameter at no point greater than the diameter of said aperture to which the device is applied.

JOHN E. JOHNSON.